(12) United States Patent
Ent et al.

(10) Patent No.: US 12,032,405 B2
(45) Date of Patent: Jul. 9, 2024

(54) COMPUTING SYSTEM

(71) Applicant: LENOVO (SINGAPORE) PTE. LTD, Singapore (SG)

(72) Inventors: Ali Ent, Morrisville, NC (US); Ghwang Hyun Lim, Morrisville, NC (US); Jung Hwan Hong, Morrisville, NC (US); Alden Rose, Morrisville, NC (US); Jeffrey E. Skinner, Morrisville, NC (US)

(73) Assignee: Lenovo (Singapore) Pte. Ltd, Singapore (SG)

( * ) Notice: Subject to any disclaimer, the term of this patent is extended or adjusted under 35 U.S.C. 154(b) by 0 days.

(21) Appl. No.: 17/849,615

(22) Filed: Jun. 25, 2022

(65) Prior Publication Data

US 2023/0418330 A1    Dec. 28, 2023

(51) Int. Cl.
*G06F 1/16* (2006.01)
*H04M 1/725* (2021.01)

(52) U.S. Cl.
CPC .......... *G06F 1/1632* (2013.01); *G06F 1/1616* (2013.01); *G06F 1/1681* (2013.01); *H04M 1/725* (2013.01)

(58) Field of Classification Search
CPC .... G06F 1/1632; G06F 1/1616; G06F 1/1681; H04M 1/725; F16M 13/022
See application file for complete search history.

(56) References Cited

U.S. PATENT DOCUMENTS

| | | | |
|---|---|---|---|
| 9,083,778 B2* | 7/2015 | Kim | G06F 1/1656 |
| 10,066,784 B2* | 9/2018 | Wessels | F16M 11/10 |
| 10,694,145 B1* | 6/2020 | Skinner | H04N 7/15 |
| 10,865,934 B2* | 12/2020 | Kwasniewski | F16M 11/041 |
| 11,048,346 B1* | 6/2021 | Burks | G06F 1/1616 |
| 11,057,549 B2 | 7/2021 | Yu et al. | |
| 11,256,294 B2* | 2/2022 | Yang | G06F 9/4856 |
| 11,509,758 B2* | 11/2022 | Ramoutar | G06F 1/1654 |
| 11,539,865 B2* | 12/2022 | Gagne-Keats | H04L 65/403 |
| 11,712,115 B2* | 8/2023 | Cheney | G06F 1/1607 248/70 |
| 2012/0309462 A1* | 12/2012 | Micev | G06F 1/1632 345/173 |
| 2021/0173431 A1* | 6/2021 | Yang | G06F 21/31 |
| 2021/0199956 A1 | 7/2021 | Stewart et al. | |
| 2021/0200340 A1* | 7/2021 | Burks | G06F 1/1643 |

OTHER PUBLICATIONS

Truckules Truck Phone Holder Mount Heavy Duty Cell Phone Holder for Truck Dashboard Windshield 16.9 inch Long Arm, Super Suction Cup & Stable, Compatible with iPhone & Samsung, Green, Pickup Truck, Jun. 2022, Amazon (https://www.amazon.com/Truckules-Dashboard-Windshield-Suction-Compatible/dp/B0B4J73HQV) (Year: 2022).*

(Continued)

*Primary Examiner* — Rockshana D Chowdhury
*Assistant Examiner* — Martin Antonio Asmat Uceda
(74) *Attorney, Agent, or Firm* — Brian J. Pangrle

(57) ABSTRACT

A system can include a display housing that includes a display, a frame, a display side, and a back side; and a cellular phone coupling that couples a cellular phone to the display housing with a portion of the cellular phone extendable a distance beyond an edge of the frame of the display housing.

20 Claims, 13 Drawing Sheets

(56) References Cited

OTHER PUBLICATIONS

Mindsky, Magnetic Phone Mount for Tesla 3/Y/S/X, Mustang Mach-E Accessories Cellphone Holder for car Monitor/Dashboard, Aug. 2021, Amazon (https://www.amazon.com/MINDSKY-Magnetic-Accessories-Cellphone-Dashboard/dp/B09CCY186B) (Year: 2021).*
Agoz, Cell Phone Holder Gooseneck Mount Lazy Clamp Clip Flexible Phone Stand for Office Desk Bed iPhone 14, 13 Pro MAX, 12, iPhone 11, XS XR X 8, Samsung Galaxy S21 S20 S10 Note 20 10 A32 A12 (Black), Sep. 2016, Amazon (https://www.amazon.com/Gooseneck-Flexible-Bracket-Kitchen-Samsung/dp/B07MWZCVLR) (Year: 2016).*
Truckules Truck Phone Holder Mount Heavy Duty Cell Phone Holder for Truck Dashboard Windshield 16.9 inch Long Arm, Super Suction Cup & Stable, Compatible with iPhone & Samsung, Green, Pickup Truck, Jun. 2022, Amazon (https://www.amazon.com/Truckules-Dashboard-Windshield-Suction-Compatible/dp/B0B4J73HQV) (Year: 2022).*
Dell, Dell Mobile Connect first look, Jan. 2018, Youtube, https://www.youtube.com/watch?v=p8yAT_c7ECc (Year: 2018).*
Marrah, M., You Will Soon Be Able to Use an iPhone as a Webcam, PetaPixel, Jun. 6, 2022 (https://petapixel.com/2022/06/06/you-will-soon-be-able-to-use-an-iphone-as-a-webcam/) (10 pages).

* cited by examiner

COMPUTING SYSTEM

TECHNICAL FIELD

Subject matter disclosed herein generally relates to technology for computing systems or other systems.

BACKGROUND

A computing system can be a clamshell system that can fold and open and can include, for example, a base housing and a display housing, or, for example, a folding housing that defines two housing portions.

SUMMARY

A system can include a display housing that includes a display, a frame, a display side, and a back side; and a cellular phone coupling that couples a cellular phone to the display housing with a portion of the cellular phone extendable a distance beyond an edge of the frame of the display housing. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
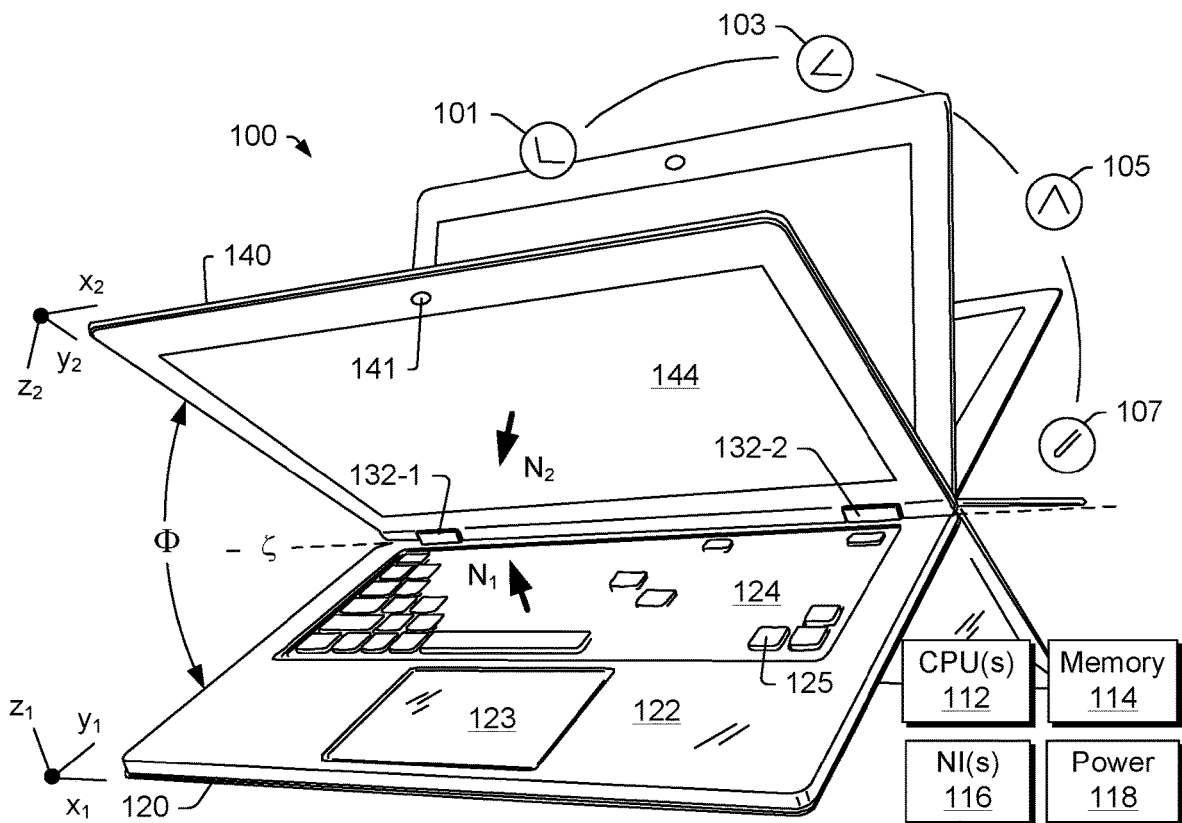
FIG. 1 is a diagram of an example of a computing device.
Figure 1:
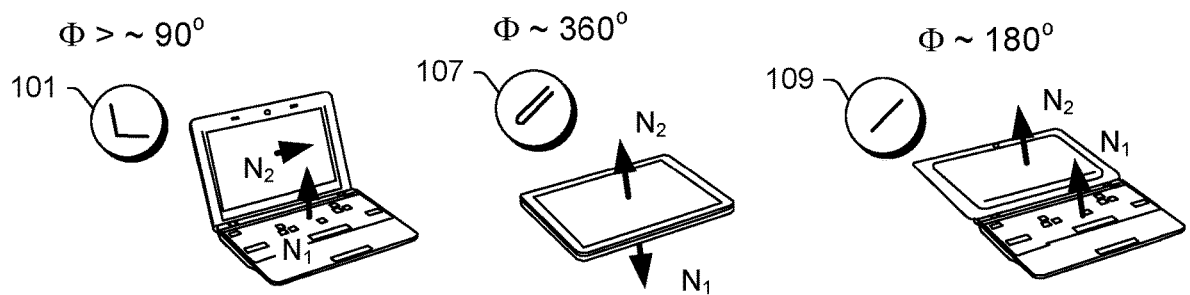

FIG. 1 shows an example of a computing device 100 (e.g., a computing system) that includes a keyboard housing 120 and a display housing 140 that are pivotable with respect to each other via movement about one or more hinges 132-1 and 132-2 (e.g., hinge assemblies). The computing device 100 may be a system such as, for example, a computing system (e.g., an information handling device, etc.).

As an example, the computing device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144 and can include a camera 141 mounted in a bezel region of a bezel that surrounds the display 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a width along an x-axis ($x_2$), a depth along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis $\zeta$ and an angle $\Phi$ about that axis.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle $\Phi$ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a system does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the computing device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the computing device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the computing device 100, the keys 125 may be contacted by the users hand or hands. A user may perceive the springiness of the keys 125 as being somewhat undesirable. For example, springy keys may interfere with a user's ability to comprehend or sense force that is sufficient to grasp the computing device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis ζ) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing systems such as laptop or notebook computing devices can be characterized at least in part by a footprint. For example, the computing device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
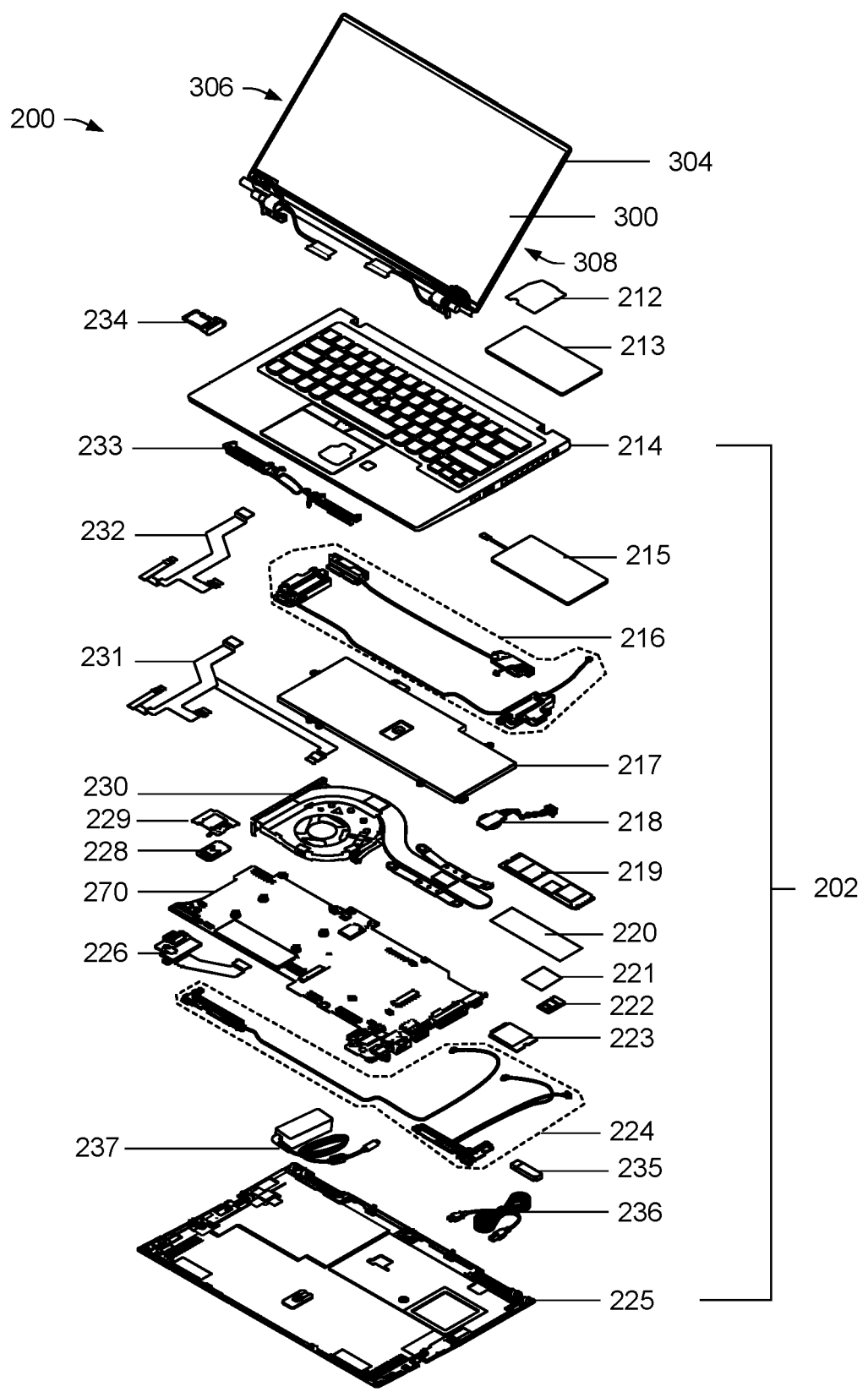
FIG. 2 is a diagram of an example of a computing device or computing system.

FIG. 2 shows an exploded perspective view of a computing device 200 as including various components, which can include, for example, a display assembly 300, a housing 304 (e.g., a display housing), insulation trackpad tape 212, a trackpad 213 or 215, a keyboard bezel assembly with a keyboard 214, a speaker kit 216, a built-in battery 217, a coin-cell battery 218, a solid-state drive 219, a thermal pad 220, NFC module foam 221, a NFC module 222, a wireless-WAN card 223, a wireless-WAN antenna assembly 224, a base cover assembly 225, a USB and power board 226, a system board 270, a fingerprint reader module 228, a fingerprint reader bracket 229, a thermal fan assembly 230, a trackpad and fingerprint reader cable 231 or 232, a wireless-LAN antenna assembly 233, a SIM-card tray 234, a recovery USB 235, a power cord 236, and an AC power adapter 237.

In the example of FIG. 2, the housing 304 includes a display side 306 (e.g., a front side) and a back side 308. In the example of FIG. 2, various components can form a housing 202, which may be referred to as a base housing and/or a keyboard housing, where the housing 202 may be coupled to the housing 304 via one or more hinge assemblies, etc. For example, the computing device 200 can include a first housing 202 coupled to a second housing 304 via one or more hinge assemblies (see, e.g., one or more hinge assemblies 326 of FIG. 3, etc.).

Figure 3:
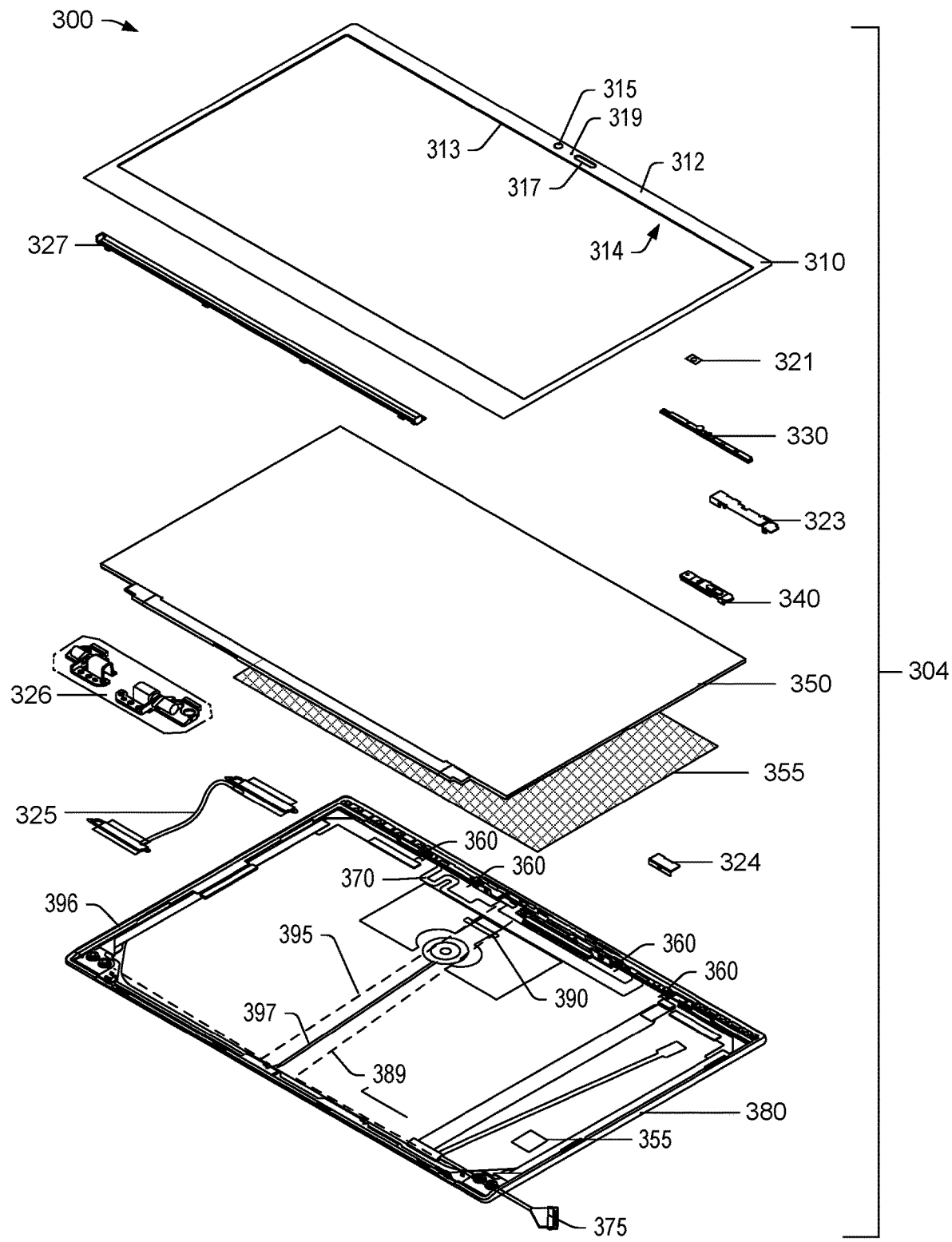
FIG. 3 is a diagram of an example of a display assembly of the computing device or computing system of FIG. 2.

FIG. 3 shows an exploded perspective view of the display assembly 300 of FIG. 2 as including various components, which can include, for example, a bezel 310, a foam component for an IR LED camera 321, a camera assembly 330, a stopper 323, a shutter 340, a display 350, an orientation sensor 355 (e.g., an accelerometer, gyroscope, etc.), a support plate 324, one or more microphones 360, wiring 370, one or more wiring connectors 375, a back side (rear) cover assembly 380, a display cable 325, one or more hinge assemblies 326, and a display bezel frame component 327.

In the example of FIG. 2 and FIG. 3, the computing device 100 can include various media capture components. For example, a camera can be a media capture component, a microphone can be a media capture component, etc. A media capture component may be an audio media capture component, a video media capture component, a still image media capture component, etc.

As shown, the bezel 310 includes a front surface 312 and an opposing rear surface 314 where various openings extend between the front surface 312 and the rear surface 314. For example, as shown, the bezel 310 includes a display opening 313, a camera opening 315, a shutter control opening 317, and an IR camera opening (e.g., where an IR camera is included, noting that a camera may be a combined visible and IR camera).

As shown, the camera assembly 330 couples to the back side cover assembly 380 where the wiring 370 operatively couples to the camera assembly 330 and to the one or more microphones 360. The display assembly 300 can be operatively coupled to other circuitry of the computing device 200, for example, via the one or more wiring connectors 375. As an example, the computing device 200 may be without a camera or camera assembly. For example, the computing device 200 may be utilized with an auxiliary camera that is provided separately, which may be connected to the computing device 200. As an example, the computing device 200 may include the camera assembly 330 with a front facing camera and/or a rear facing camera where the computing device 200 can be utilized with or without an auxiliary camera.

In the example of FIG. 3, the display assembly 300 may include one or more rigid support members 389, which may, for example, extend between one or more of the one or more hinge assemblies 326 and upward toward the camera assembly 330. In such an example, force may be carried by the one or more rigid support members 389 in a manner that may reduce risk of distorting the display 350. As an example, the one or more rigid support members 389 may help to more evenly distribute force with respect to a hinge assembly or hinge assemblies such that risk of twisting a display panel (e.g., out of a plane) is reduced.

In the example of FIG. 3, the display assembly 300 includes a frame 396, which may be part of the back side cover assembly 380 or one or more components coupled to the back side cover assembly 380 (e.g., directly and/or indirectly). As an example, the bezel 310 can be a frame and/or part of the frame 396. In the example of FIG. 3, the frame 396 may define an outer perimeter of the display assembly 300 with an upper edge (e.g., top edge), a lower edge (e.g., a bottom or hinge edge), and opposing side edges (e.g., a left edge and a right edge). In the example of FIG. 3, the frame 396 can be akin to a picture frame that surrounds the display 350, noting that the display assembly 300 may include the bezel 310 and/or be a so-called bezel-less display assembly where the size of a bezel at one or more edges is small or does not exist.

In the example of FIG. 3, the display assembly 300 can include one or more magnets 390 that can generate a magnetic attraction force to couple a phone to the back side cover assembly 380. As an example, the display assembly 300 can include a wireless interface 395, which can include one or more antennas. In such an approach, the wireless interface 395 can be coupled to circuitry 397, which may provide for interactions with circuitry of the housing 202. In the example of FIG. 3, the display assembly 300 may include one or more shields 355 that can act to shield one or more components from electrical and/or magnetic fields. For example, the one or more shields 355 can include a Faraday shield that can help to reduce fields associated with circuitry and/or can include a high magnetic permeability metal alloy (e.g., permalloy, mu-metal, nanocrystalline grain structure ferromagnetic metal coating, etc.), which can draw a field into themselves, providing a path for magnetic field lines around a shielded region. As an example, the one or more magnets 390 may have an associated shield or shields and, for example, the wireless interface 395 may have an associated shield.

As an example, a magnet can be a permanent magnet, an electromagnet or an electropermanent magnet. As an example, circuitry can be included for control of an electromagnet and/or an electropermanent magnet, for example, to switch or otherwise control a magnetic field.

As an example, a system can include a display housing that includes a display, a frame, a display side, and a back side; and a cellular phone coupling that couples a cellular phone to the display housing with a portion of the cellular phone extendable a distance beyond an edge of the frame of the display housing. For example, a computing system such as the computing device 200 can include the housing 304 as a display housing that includes the display 350, the frame 396, the display side 306 and the back side 308 where a cellular phone coupling can be integrated into the housing 304 or otherwise attached to the housing 304. As an example, a cellular phone coupling can couple a cellular phone (e.g., a phone) to the housing 304 with a portion of the cellular phone extending a distance beyond an edge of the frame 396 of the housing 304. As an example, the one or more magnets 390 may be a cellular phone coupling or part of a cellular phone coupling. As an example, a clip may be part of a cellular phone coupling that can be attached to the housing 304 via the one or more magnets 390 and/or via one or more other mechanisms (e.g., consider a U-shaped member that can fit over an edge of the frame 396 of the housing 304).

Figure 4:
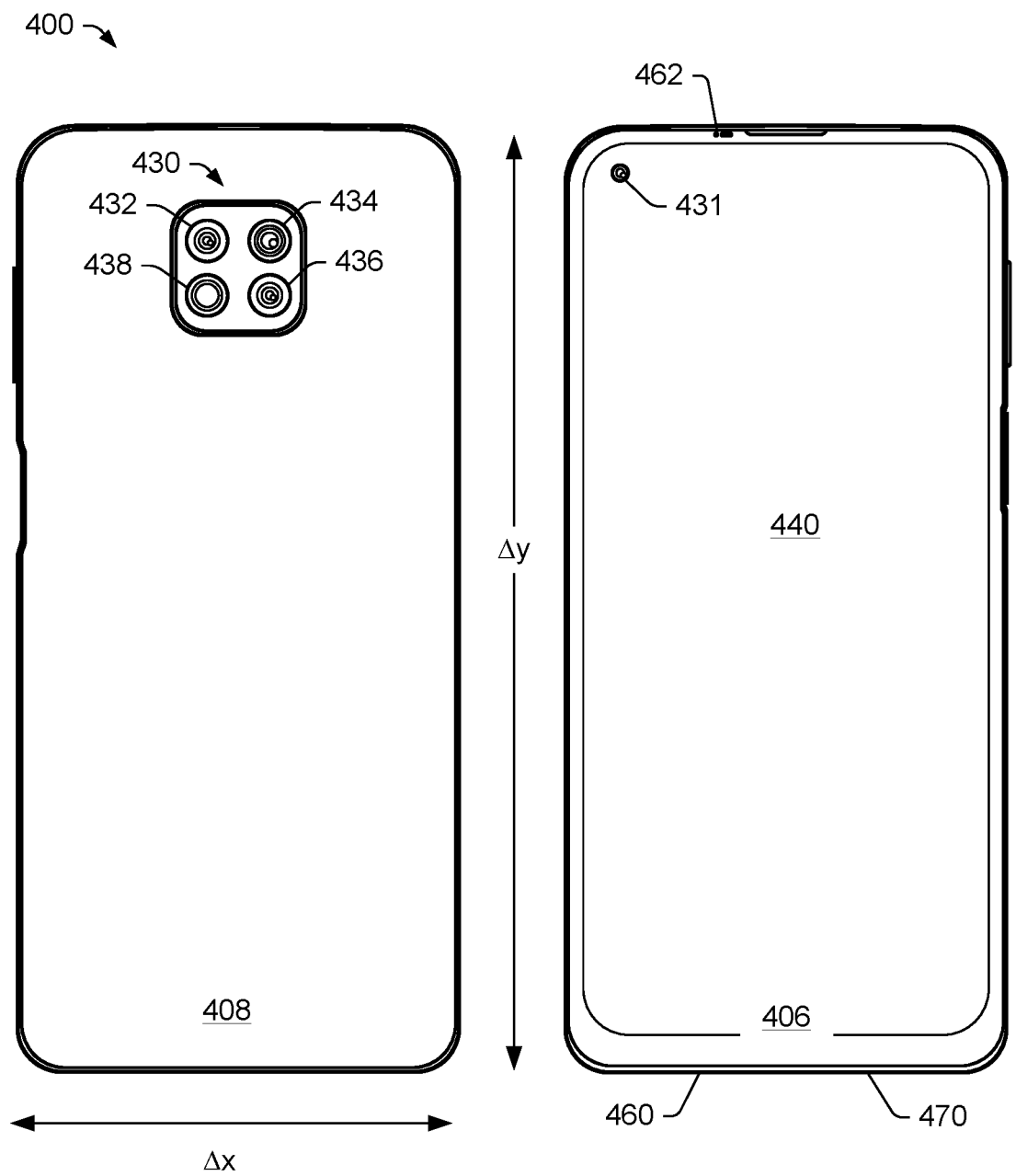
FIG. 4 is a diagram of an example of a phone.

FIG. 4 shows an example of a phone 400 that includes a front, display side 406 and a back side 408, where the front, display side 406 is defined with respect to a display 440, which can be a touch sensitive display. The phone 400 can include one or more processors, memory and processor-executable instructions stored in the memory. The phone 400 can include display circuitry that is operatively coupled to the display 440 and one or more other features of the phone 400. The phone 400 includes one or more interfaces such as a wireless cellular interface, a BLUETOOTH interface, a wired interface, etc. As an example, the phone 400 can include a SIM card that provides subscriber information such as, for example, a phone number such that a user can place phone calls using a wireless interface of the phone 400 (e.g., GSM, CDMA, satellite, etc.). As shown, the phone 400 can be defined by various planar dimensions (e.g., $\Delta x$ and $\Delta y$), along with a thickness (e.g., $\Delta z$), as may be described with respect to a Cartesian coordinate system.

In the example of FIG. 4, the phone 400 includes a camera assembly 430, which can include at least one camera 432, 434 and 436 and optionally a light 438 (e.g., a beauty light, a scene light, a flash, etc.), which can be operatively coupled to one or more processors of the phone 400. In the example of FIG. 4, the camera 432 can be a depth camera, the camera 434 can be a main camera and the camera 436 can be a macro camera. As shown, the camera assembly 430 can include one or more back side cameras and can include one or more front, display side cameras such as the camera 431. In the example of FIG. 4, the phone 400 includes a microphone 460 and a speaker 470 and may include one or more proximity sensors 462.

Figure 5:
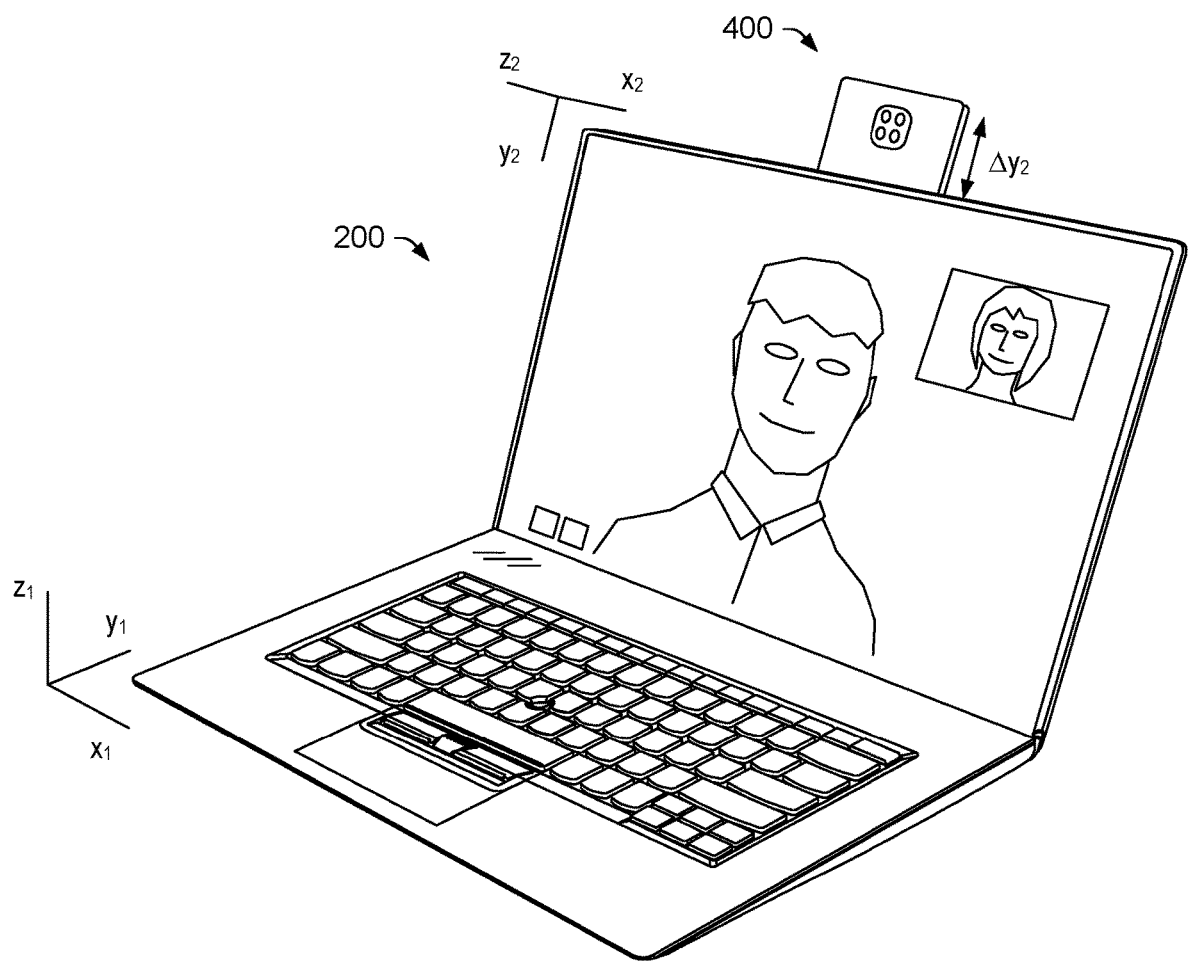
FIG. 5 is a diagram of an example of the computing device or computing system of FIG. 2 and an example of the phone of FIG. 4 coupled to the computing device.

FIG. 5 shows an example of the computing device 200 along with an example of the phone 400 as coupled to the computing device 200. As shown, the phone 400 can be coupled to the housing 304 of the computing device 200 where at least one camera of the camera assembly 430 of the phone 400 can be facing a user of the computing device 200 and utilized as a substitute camera for the computing device 200. For example, if the computing device 200 does not include a camera, includes a camera of lesser capabilities than a camera of the camera assembly, etc., the computing device 200 can utilize a camera of the camera assembly 430 of the phone. In the example of FIG. 5, a small inset image rendered to the display 350 of the computing device 200 can be an image generated by the camera assembly 430 of the phone 400, while a larger image rendered to the display 350 can be generated by a remote camera of a participant in a video call with a user of the computing device 200.

As an example, the phone 400 can be coupled to the computing device 200 using one or more mechanisms. For example, consider use of the one or more magnets 390 as shown in FIG. 3. As an example, a position of the phone 400 with respect to an edge of the display assembly 300 may be adjustable, for example, up and down as indicated by a dimension Aye. In such an approach, a user may adjust a perspective of a camera of the phone 400 for purposes of suitably framing a subject such as the head of the user. In the example of FIG. 5, the back side 408 of the phone 400 is facing the back side cover assembly 380 of the computing device 200 such that the display 440 of the phone 200 is facing outwardly away from the back side cover assembly 380.

In various instances, a back facing camera of a phone may be of a higher quality than a front facing camera of a phone because, for example, the front side of the phone is a display side that aims to maximize display area; whereas, the back side can be relatively free of features thereby providing sufficient space for one or more cameras, flashes, etc. In such instances, the back facing camera of the phone may be of a higher quality than a front facing camera of a notebook computing device, which may utilize a relatively small front facing camera and lens to maximize display area. For various reasons, a user may desire using a camera that is of a higher quality than the front facing camera of a notebook computing device. Where such a notebook computing device allows for coupling of a phone and use of one or more cameras of the phone for a video call, as shown in the example of FIG. 5, a user and/or one or more call participants may have a better experience.

Figure 6:
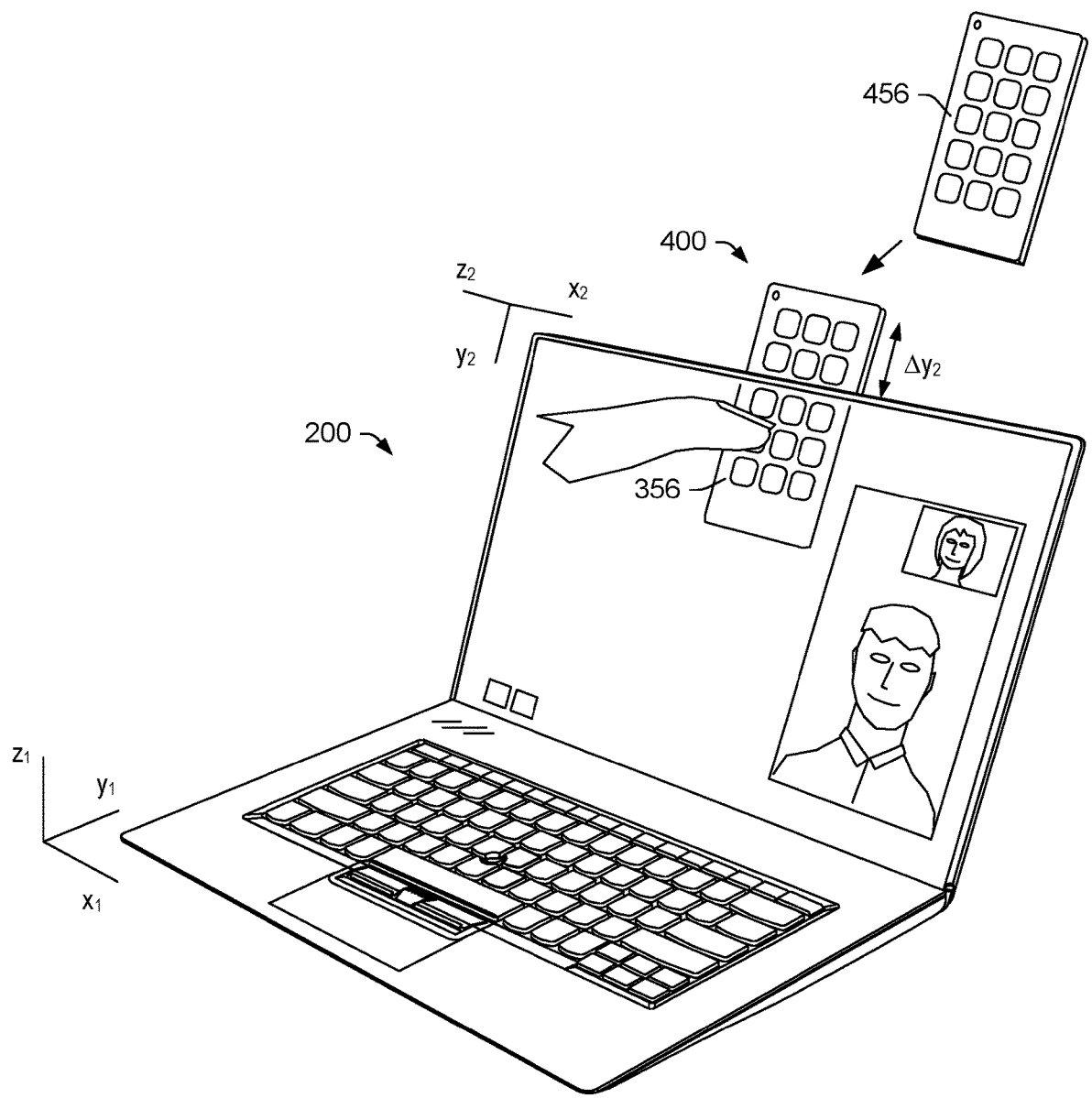
FIG. 6 is a diagram of an example of the computing device or computing system of FIG. 2 and an example of the phone of FIG. 4 coupled to the computing device.

FIG. 6 shows an example of the computing device 200 and an example of the phone 400 where the front, display side of the phone 400 is facing the back side cover assembly 380 of the housing 304 of the computing device 200. In such an example, the front facing camera 431 of the phone 400 may be utilized as an alternative to a camera of the computing device 200.

In the example of FIG. 6, the phone 400 is shown as having a GUI 456 rendered to the display 440 where a virtual GUI 356 can be rendered to the display 350 of the computing device 200. In such an example, the virtual GUI 356 can be a replica of at least a portion of the GUI 456, which may be dynamic in that it can be rendered responsive to coupling and/or positioning of the phone 400 with respect to the computing device 200. For example, the GUI 456 is shown as including 15 icons in 5 rows and 3 columns. In such an example, if the phone 400 is translated up or down, the number of icons rendered to the display 350 of the computing device 200 can change automatically. As indicated in FIG. 6, the virtual GUI 356 can be controlled, for example, via touch. As an example, icons of a GUI can include number pad icons such that a user can enter a phone number to make a phone call using circuitry of the phone 400. For example, if a user of the computing device 200 wants to place a call, rather than touching the phone 400, the user may touch the display 350 where the virtual GUI 356 is located. In such an example, the computing device 200 can be operatively coupled to circuitry of the phone 400 such that an entered phone number is transmitted to the phone 400 to instruct communication circuitry of the phone 400 to make the call. As an example, once a call has been placed and connected, a virtual GUI may disappear or be minimized, which may provide increased display area for purposes of viewing a call participant and/or other call related content. As an example, a call may be a call placed through an application such as a video conferencing application (e.g., MS TEAMS, ZOOM, etc.).

Figure 7:
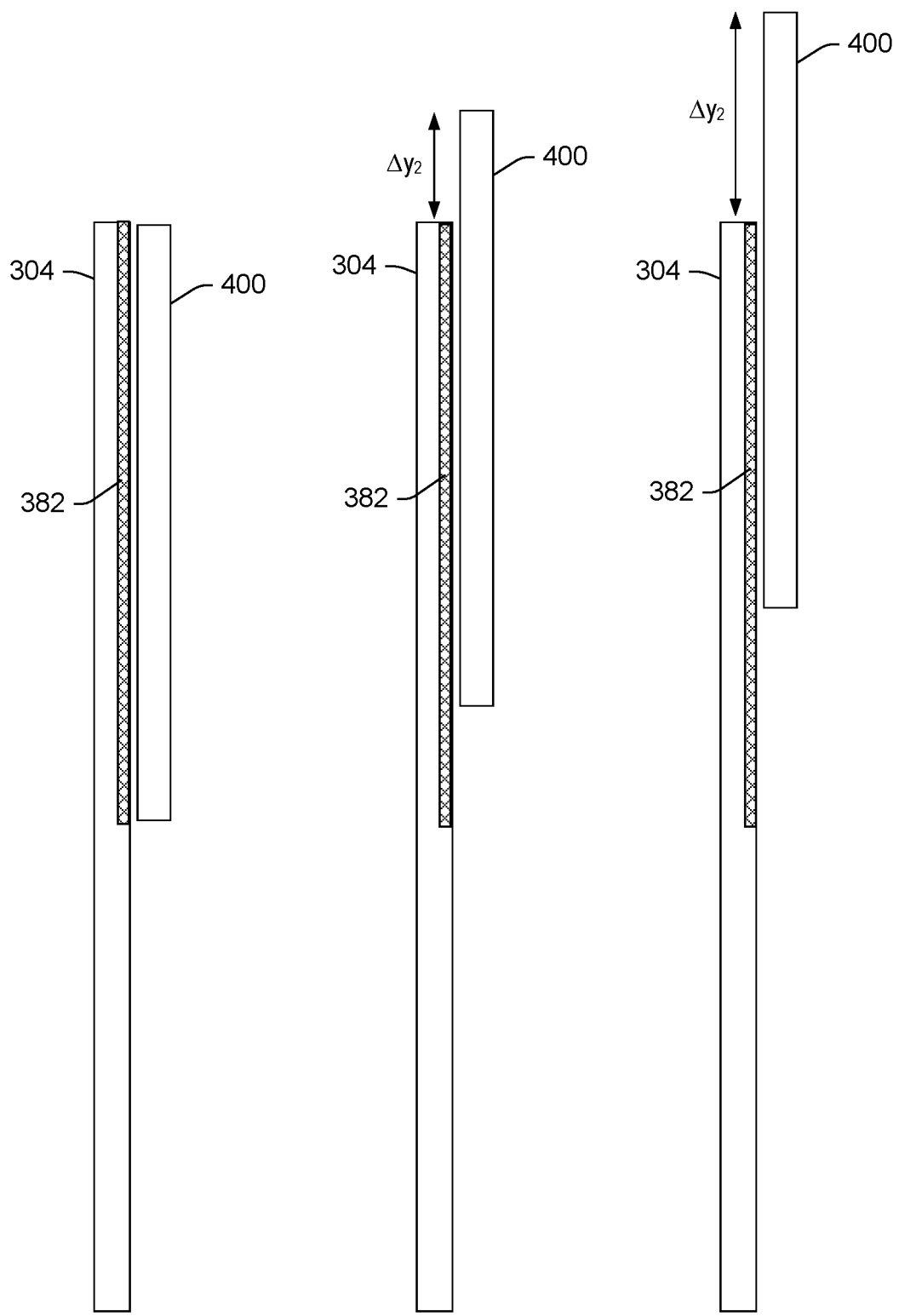
FIG. 7 is series of diagrams of example scenarios where a phone is extendable beyond an edge of a display housing.

FIG. 7 shows an example of the housing 304 and an example of the phone 400 where circuitry 382 of the housing 304 can provide for detection of presence and/or position of the phone 400. In such an example, the circuitry 382 can include one or more sensors, which can include an antenna as a sensor, a Hall effect sensor, a contact sensor, etc. In the example of FIG. 7, where the display 350 of the housing 304 is utilized for rendering a GUI, the rendering may depend on presence and/or position of the phone 400 as may be detected by the circuitry 382. As an example, the circuitry 382 may provide for presence and/or position detection whether the phone 400 is front facing or back facing. As an example, the circuitry 382 may detect whether the phone 400 is front facing or back facing. For example, a sensor signal may differ as to amplitude, phase, etc., depending on whether the phone is front facing or back facing.

As an example, the circuitry 382 may include or be operatively coupled to an antenna that can transmit one or more of power and data. For example, consider an antenna that adheres to the Qi standard, which can provide for transmission of power and data. For example, the Qi standard provides features for handshakes, identification, position information, alignment information, amongst others.

As an example, the housing 314 can include one or more magnets that provide for attraction and alignment when the phone 400 is in a particular position. For example, in one or more of the positions shown in FIG. 7, an antenna of the housing 314 may be suitably aligned with an antenna of the phone 400 for purposes of transmission of power and/or data. In such an approach, where power is provided, the phone 400 may operate for a desired amount of time via power supplied by the computing device 200. As to data, such data may provide for rendering of a GUI by the computing device 200 and/or one or more other actions by either or both of the computing device 200 and the phone 400.

As an example, a display housing such as the housing 304 can include an indented portion that can be a recess for receiving a portion of a phone such as the phone 400 (e.g., consider the cross-hatched region in FIG. 7 as being an indented portion that can be a recess). In such an example, the recess may be several millimeters in depth and have a width sufficient to accommodate one or more types of phones (e.g., consider a width of 4 cm to 9 cm) along with a height to accommodate one or more types of phones (e.g., consider a height of 10 cm to 18 cm). In such an example, the recess may be sufficient to position the phone below or even with an edge of a display housing while being able to also position the phone extending beyond the edge of the display housing. Such a recess may facilitate movement of the phone. As an example, a display housing can include one or more magnets that help to guide movement along a dimension of such a recess. As an example, a recess may be of dimensions sufficient to accommodate a phone that is in a case such as, for example, a relatively thin polymeric case, which may include a perimeter that extends outwardly from a display side to help protect display glass from contact with a surface. As an example, a recess may be provided with a finish and/or a material that reduces risk of scratching of display glass of a phone when a display side of a phone is facing a back side of a display housing, particularly where movement (e.g., sliding movement) may occur to position the phone with respect to an edge of the display housing. As an example, a material may be a polymeric material, a woven material, etc. Where such material is recessed (e.g., disposed in an indented portion), the material may be less likely to come into contact with an object such as a desktop, etc., which may help protect the material for use in protecting display glass of a phone. As an example, a material may be a lens wipe or display wipe type of material (e.g., consider a fiber material, which may be a microfiber material, etc.) where movement of a phone against the material may help to clean display glass of the phone.

Figure 8:
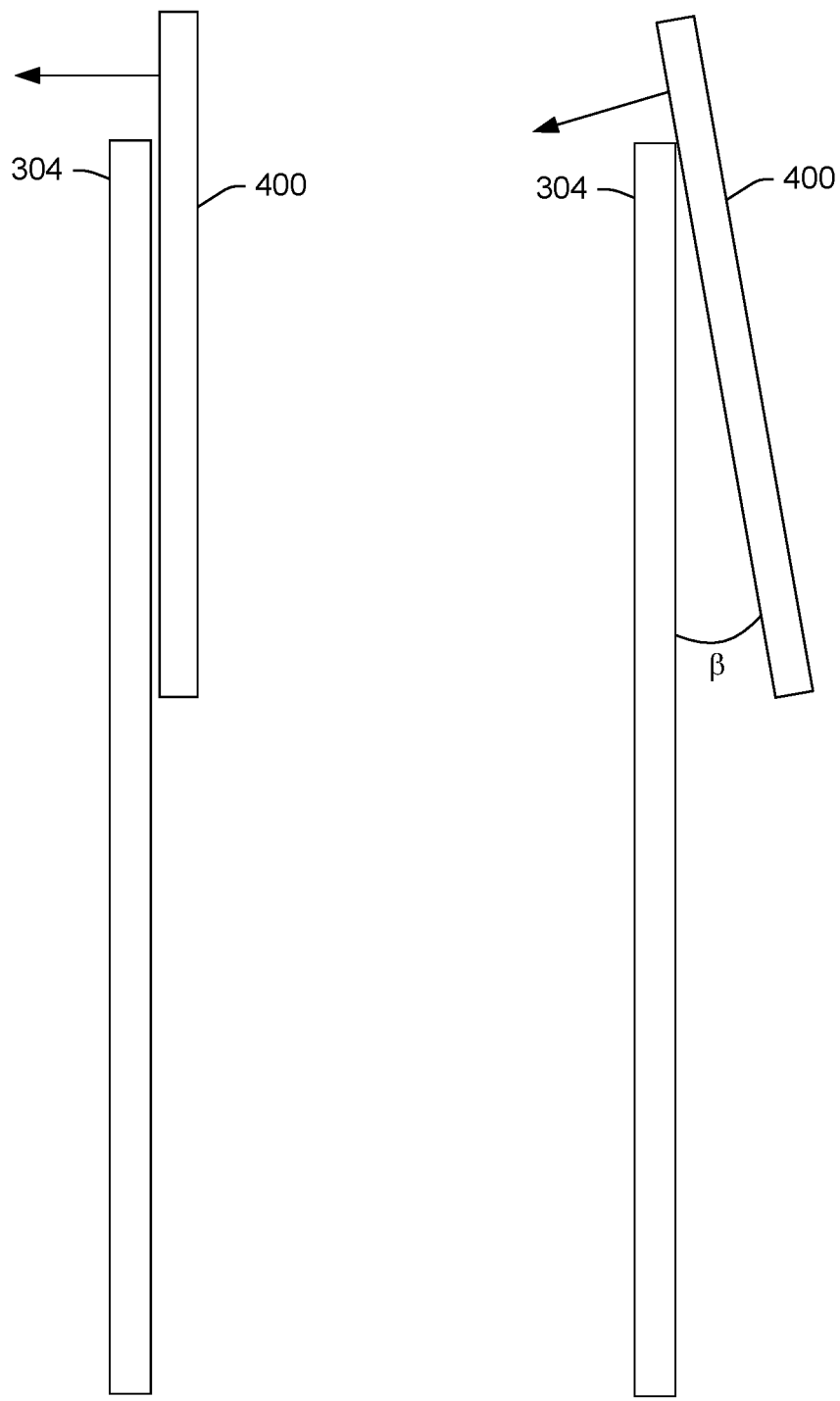
FIG. 8 is series of diagrams of example scenarios where a phone is extendable beyond an edge of a display housing and tiltable with respect to the display housing.

FIG. 8 shows an example of the housing 304 and an example of the phone 400 where the phone 400 may be tilted with respect to the housing 304, as indicated by a tilt angle β. As shown, a view of a camera can be defined by an axis where it may be desirable to change an angle of the axis. For example, if a user tilts back the housing 304 with respect to the base housing 202, the user may want to adjust the view of the camera by tilting the phone 400. In such an approach, one or more mechanisms may be utilized to tilt the phone 400.

Figure 9:
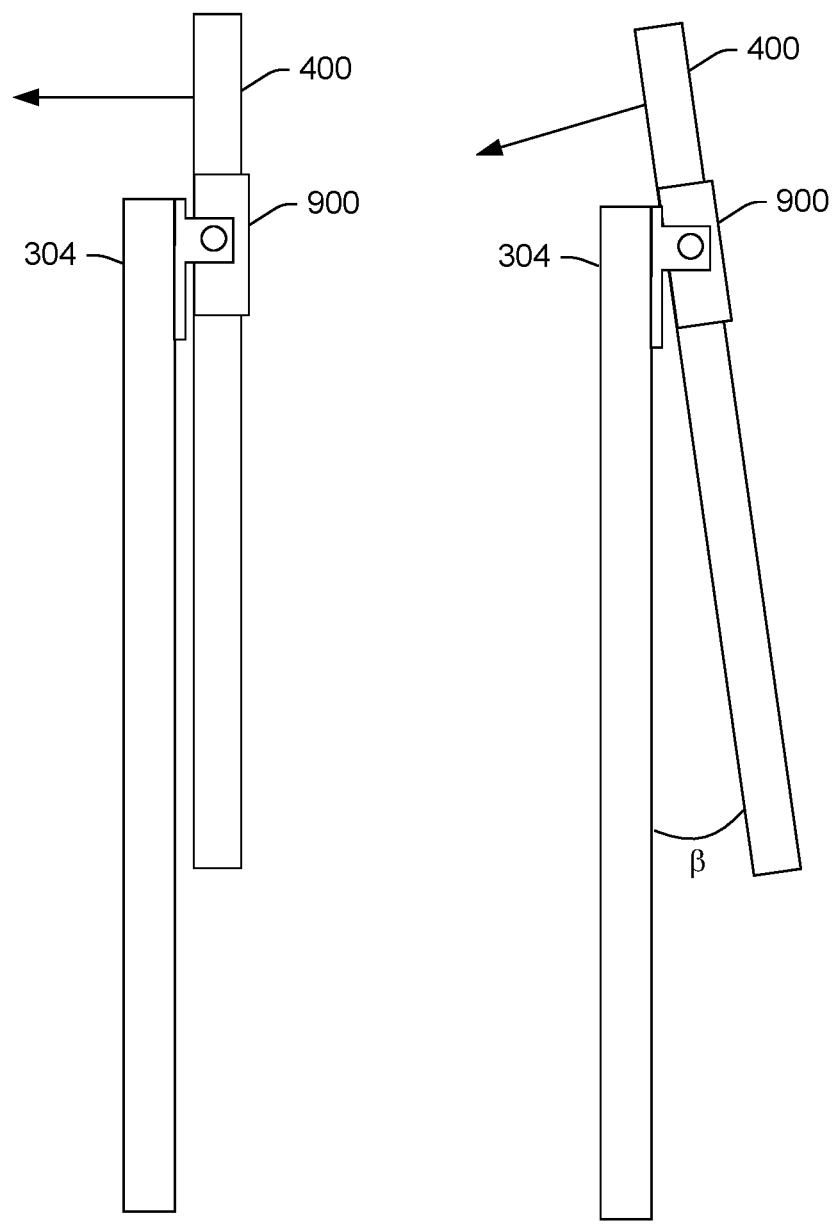
FIG. 9 is a series of diagrams of example scenarios where a phone is extendable beyond an edge of a display housing and tiltable with respect to the display housing.

FIG. 9 shows an example of the housing 304 and an example of the phone 400 where an example of a clip 900 is shown where the clip 900 can be part of a cellular phone coupling to attach the phone 400 to the housing 304. As an example, a clip may have a tilt mechanism or not. Where a clip does not include a tilt mechanism, the clip may be utilized to couple the phone 400 to the housing 304 parallel to the housing 304 or at a fixed angle with respect to the housing 304.

Figure 10:
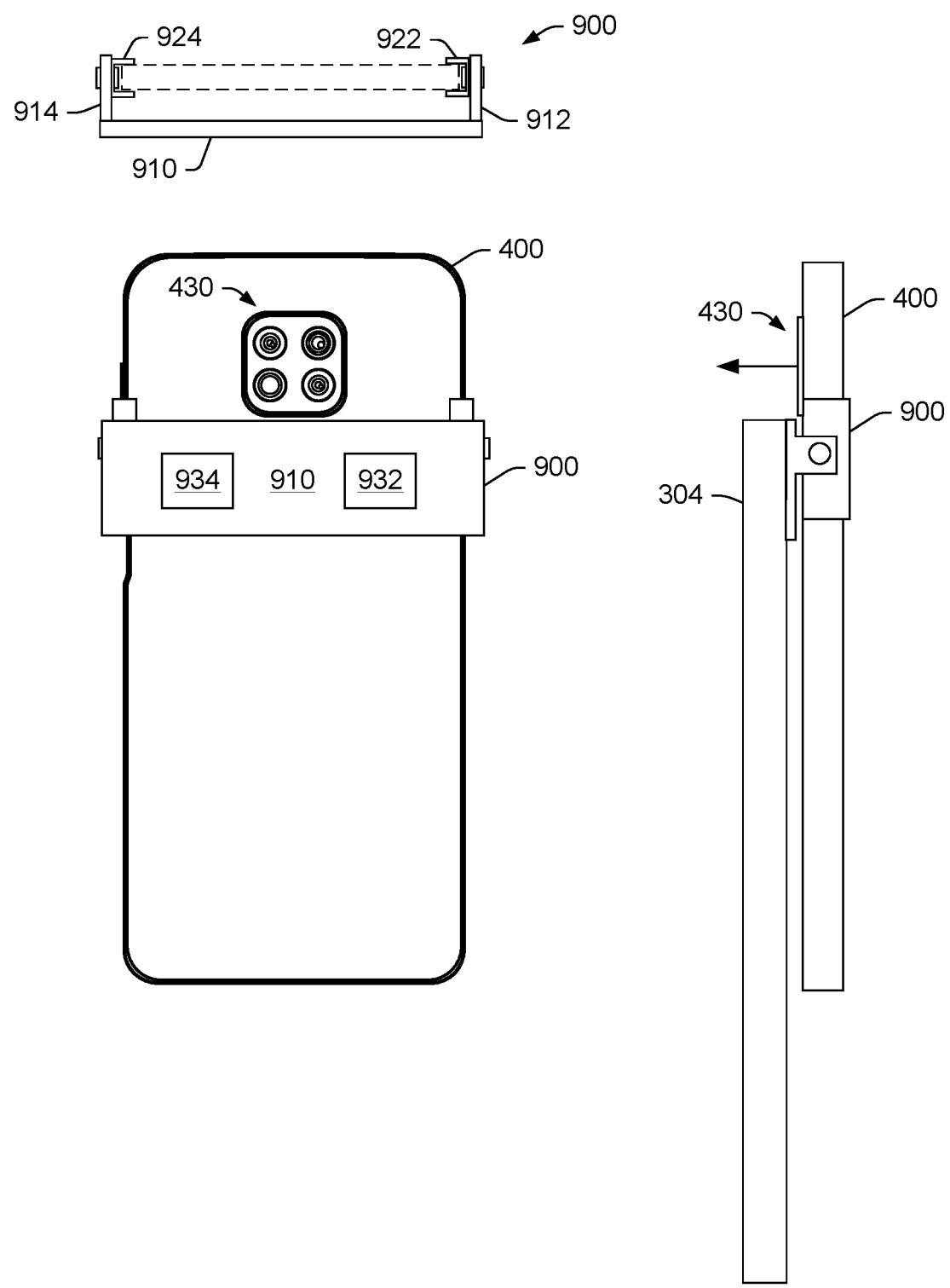
FIG. 10 is a series of diagrams of an example of a phone and an example of a clip.

FIG. 10 shows an example of the clip 900 as including a tilt mechanism. As shown, the clip 900 include a plate 910 with extensions 912 and 914 that couple to sockets 922 and 924. In such an approach, the phone 400 can be secured via the sockets 922 and 924, which can grip opposing edges of the phone 400. In such an approach, the tilt mechanism can include bores and axles that allow the sockets 922 and 924 to be rotatable to tilt the phone 400.

In the example of FIG. 10, the plate 910 may include one or more features 932 and 934, which can be one or more ferromagnetic materials (e.g., magnetic materials or materials attracted to a magnet), interfaces, and sensors. For example, a magnet or magnets can be utilized to couple the clip 900 to the housing 304; an interface or interfaces can be utilized to transmit and/or receive one or more of power and data; and a sensor or sensors can be utilized to determine a status, a position, etc., of the phone 400. As to one or more magnets, consider, for example, the magnet 390 of FIG. 3 as providing for a magnetic attraction force for attaching the plate 910 to the housing 304. As an example, a housing and a clip can form a cellular phone coupling through use of one or more magnets and one or more pieces of ferromagnetic material, which may be part of the housing or the clip (e.g., the clip can include a permanent magnet or the housing can include a permanent magnet while the housing or the clip can include a ferromagnetic material, respectively).

Figure 11:
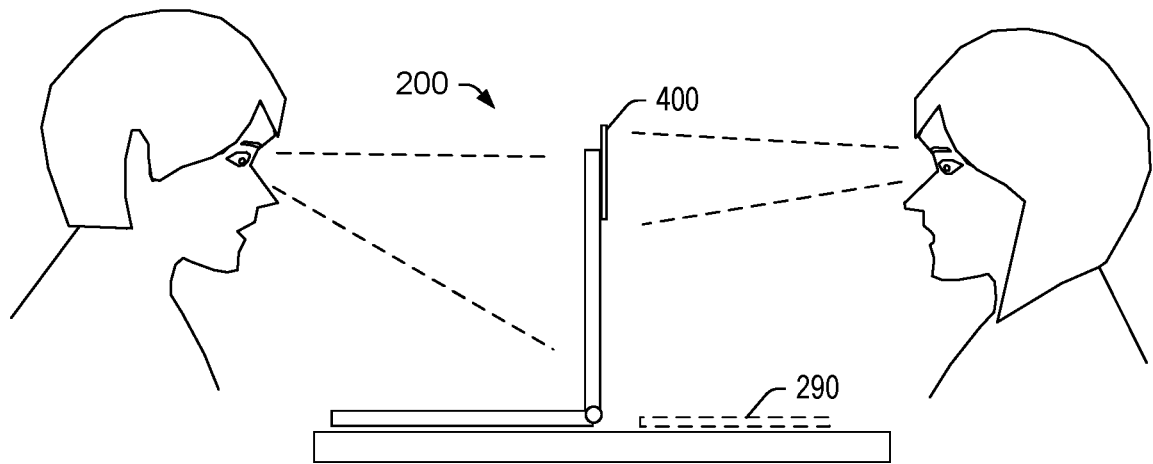
FIG. 11 is a series of diagrams of example scenarios.
Figure 11:
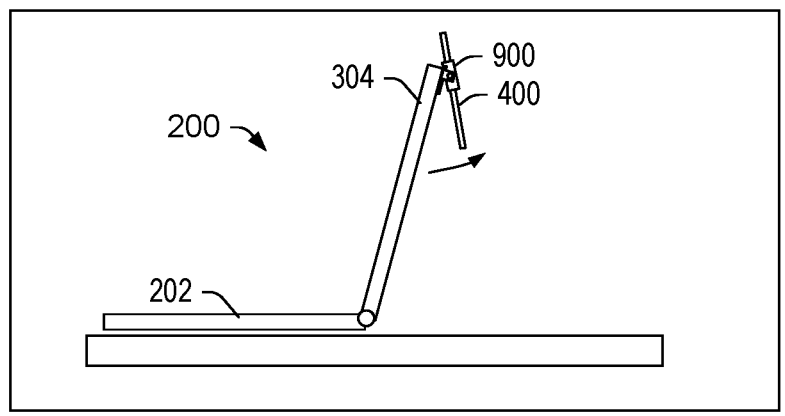
Figure 11:
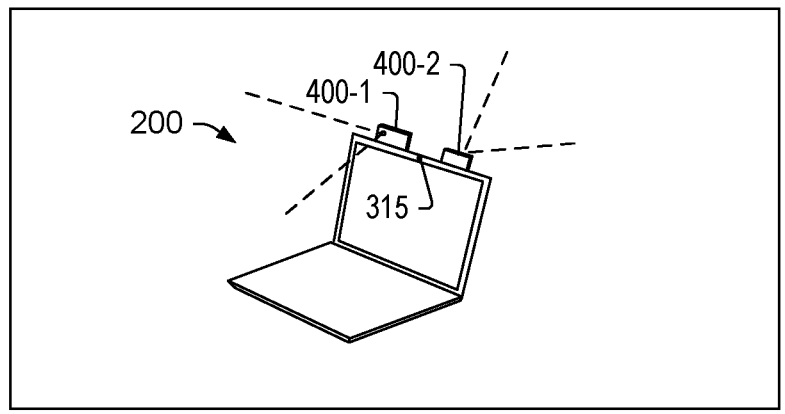

FIG. 11 shows an example scenario where two individuals are opposite each other with respect to a desktop or tabletop with the computing device 200 in front of one of the individuals and with the phone 400 in front of the other individual. As shown via dashed lines, an accessory keyboard 290 and/or another accessory input device may be provided. In the example of FIG. 11, the scenario can be referred to as a battleship mode where the computing device 200 is a clamshell device that is open and the phone 400 (e.g., a mobile computing device, etc.) is attached to the housing 304 and where circuitry can provide for rendering content to the display 440 of the phone 400. In such an example, one or more controls, settings, etc., may provide for determining what is rendered to the display 440 of the phone 400 (e.g., name, contact information, photos, video, etc.).

FIG. 11 also shows an example where the clip 900 is utilized to position the phone 400 at an angle (e.g., a tilt angle), which can provide for a suitable viewing angle for an individual. For example, if the individual to the left tilts back the housing 304 past 90 degrees with respect to the housing 202, that will reduce the angle of the phone 400 for the other individual. To compensate, the clip 900 can include a tilt mechanism that can tilt the phone 400 at a suitable angle.

As an example, the clip 900 may provide for automatic adjustment of the position of the phone 400. For example, where the sockets 922 and 924 can rotate freely as pivot points, a gravity related force (e.g., $F=mg$) may cause the phone 400 to tilt responsive to tilting or position with respect to gravity of the housing 304. In such an approach, the phone 400 may maintain a position that is relatively vertical and aligned with a direction of gravity.

FIG. 11 also shows an arrangement where the computing device 200 has more than one phone 400-1 and 400-2 coupled to it. In such an example, the computing device 200 may or may not include the camera opening 315 as associated with a camera.

In various examples two individuals may utilize the computing device 200 for purposes of video conferencing. For example, consider a scenario where one individual uses a camera of the computing device 200 and another individual uses a camera of the phone 400. In such an example, the individuals may be in a group conference call with one or more individuals. Consider two individuals at one site in one room where one of the individuals has only a phone and wants to use the phone but does not want to hold it by hand as holding by hand can lead to a sub-optimal video conference call experience. In such an example, the individual with the phone may couple it to a computing device of the other individual such that it is stabilized and at an appropriate level and/or angle, which may be adjustable using a coupling with features that provide for adjustability. As an example, rather than using a camera of the computing device, if it has one, the other individual may also utilize a camera of the phone. For example, the individual on the right may provide the phone 400 with a front facing and a back facing camera where the individual on the right can couple the phone 400 to the computing device in either a display side toward a back side of the computing device 200 or a back side toward the back side of the computing device 200. In such an approach, both the individual on the left and the individual on the right may utilize opposing facing cameras of the phone 400. As an example, the individual on the right may have a display of the phone 400 facing her so she can see various types of content associated with a video conference call, while the individual on the left may utilize a display of the computing device 200 to see such content.

Often two people may want to participate in a video conference call in an office of one of the people. In such a scenario, the video conference call can proceed in a suitable manner through use of a single computing device with the addition of a phone that can couple to the computing device. In such an approach, the person that has to walk to the other person's office (or meeting room), may not have to carry her laptop computer and thereby not risk dropping it or leaving it somewhere. While the scenario is described with respect to a workplace setting, it may also be suitable for non-work settings. For example, consider a couple that want to have a video conference with a friend where the couple does not want to sit side-by-side to squeeze into a view of a single camera. Rather, the couple can sit opposite one another at a table or a counter without feeling cramped. Further, a display housing of a computing device may act as a barrier to particles emitted when one or both of the people breath, talk, cough or sneeze where such a barrier would not exist between them if they were sitting side-by-side closely in an effort to be within a field of view of a single camera.

In some instances, such as at a coffee shop or café, a table may be limited in space such that two laptop computers do not fit conveniently on the table. In such instances, a single laptop with a cellular phone coupling can provide for one or more use cases, which may include, for example, video conferencing, gaming, sharing content, etc.

As an example, a phone may magnetically attach to an outside surface of a laptop such that both devices could be carried as one. In such an example, a display side of the phone may be facing outwardly and be available for notifications to pop up on the display while the laptop is closed. In such an approach, circuitry of the devices may be operatively coupled for purposes of notifications, content rendering, etc. As an example, a phone may be utilized to render video and/or audio content as may be stored or otherwise accessed via a laptop computing device. For example, on a plane or other cramped space, a user may view and/or listen to content using a phone coupled to the laptop where a graphical user interface of the phone may control content selection, content rendering, etc.

As an example, with a phone coupled to a display housing of a laptop computing device, the user can have a front or selfie camera and/or can have a world facing camera. For example, a user at a desk, table, etc., may want an outward view of what is behind the display housing. In such an example, a user may be aware of an environment without having a view of that environment blocked by the user's display housing. As an example, a system may provide for augmented reality or recording an event out in front of a display housing of a computing device while using the computing device. As explained, a computing device may be a tablet device or a clamshell device (e.g., notebook or laptop). A cellular phone coupling can be utilized to couple a cellular phone to a computing device for one or more purposes, which can include convenience in carrying and/or functional uses of a display and/or one or more cameras of the cellular phone. As an example, a display device (e.g., a monitor) may include a cellular phone coupling, which may serve one or more purposes, which can include convenience in carrying and/or functional uses of a display and/or one or more cameras of a cellular phone coupled to the display device via the cellular phone coupling.

Figure 12:
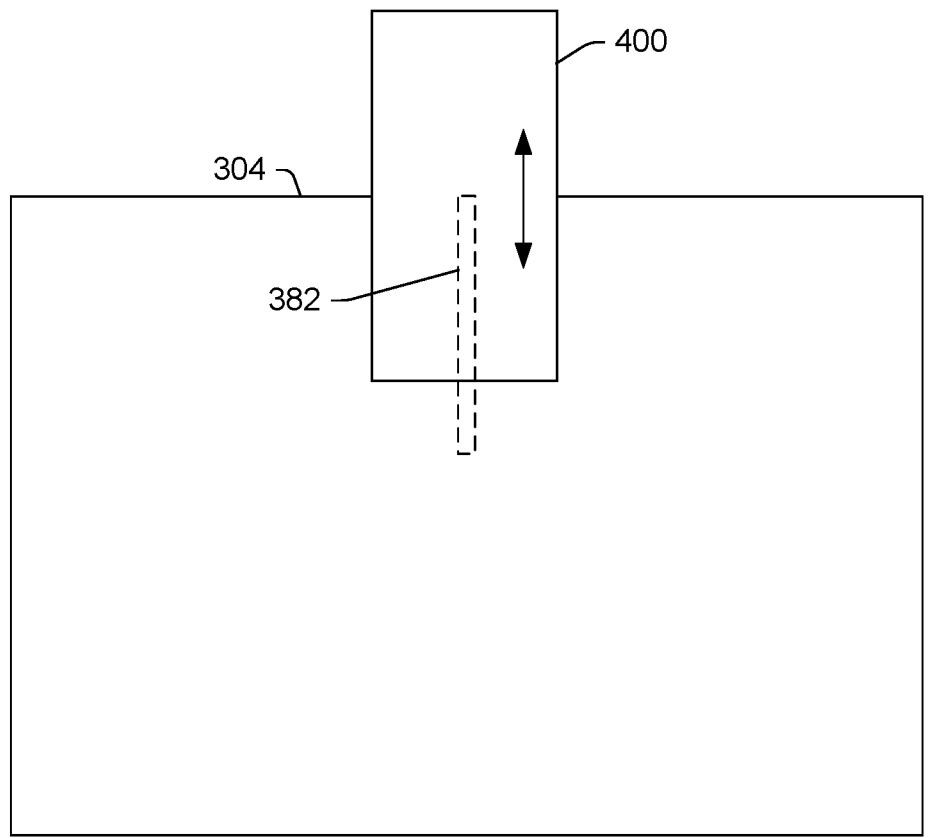
FIG. 12 is a diagram of an example scenario, a block diagram of example components, and a block diagram of an example of a method.
Figure 12:
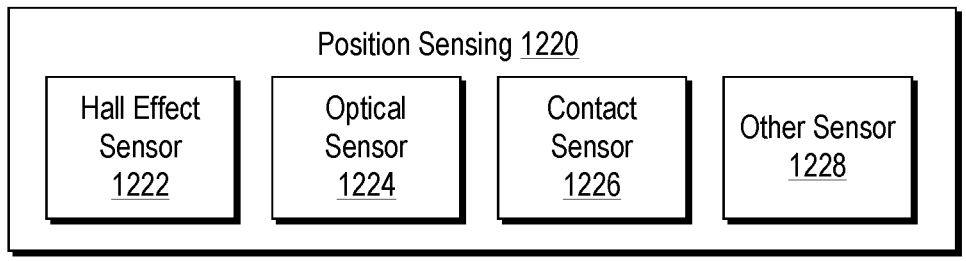
Figure 12:
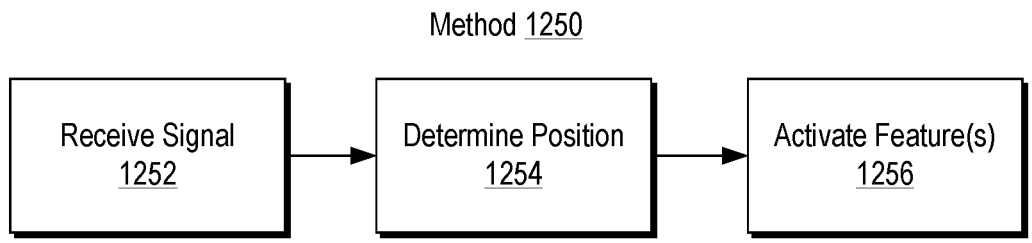

FIG. 12 shows an example of the housing 304 and an example of the phone 400 where the phone 400 can be positioned with respect to the housing 304 and where the housing 304 includes the circuitry 382. As shown in FIG. 12, one or more components can be utilized for purposes of position sensing (e.g., position detection), which may be part of the circuitry 382. As shown, one or more position sensing components 1220 can include one or more of a Hall effect sensor 1222, an optical sensor 1224, a contact sensor 1226 and one or more other types of sensors 1228. As an example, a method 1250 can include reception block 1252 for receiving a signal, a determination block 1254 for determining a position, and an activation block 1256 for activating one or more features based at least in part on the determined position, which may be, for example, a physical position of the phone 400 with respect to the housing 304 or physical presence of the phone 400 with respect to the housing 304.

As an example, a system can include a display housing that includes a display, a frame, a display side, and a back side; and a cellular phone coupling that couples a cellular phone to the display housing with a portion of the cellular phone extendable a distance beyond an edge of the frame of the display housing. In such an example, the cellular phone coupling can include at least one component that couples the cellular phone to the display housing with a back side of the cellular phone facing the back side of the display housing and that couples the cellular phone to the display housing with a display side of the cellular phone facing the back side of the display housing. For example, consider at least one magnet, a clip or a combination of a clip and at least one magnet.

As an example, a system can include circuitry that makes a distinction between a back side of a cellular phone facing a back side of a display housing and a display side of the cellular phone facing the back side of the display housing. In such an example, based on the distinction, circuitry can select at least one camera of the cellular phone from a plurality of cameras of the cellular phone for image capture and image rendering to the display of the display housing, where the plurality of cameras of the cellular phone can include at least one display side camera and at least one back side camera.

As an example, a system can include circuitry that makes a distinction between a back side of a cellular phone facing a back side of a display housing and a display side of the cellular phone facing the back side of the display housing. In such an example, based on the distinction that the display side of the cellular phone faces the back side of the display housing, circuitry can render a representation of at least another portion of the cellular phone to the display of the display housing. In such an example, an adjustment to position of the cellular phone with respect to the display housing can cause adjustment of the representation rendered to the display of the display housing. For example, by moving the cellular phone up or down with respect to a top edge of the display housing, the representation may be adjusted to show less or more of the cellular phone. As an example, responsive to moving a cellular phone left or right with respect to a top edge of a display housing, a representation of at least a portion of the cellular phone may be moved left or right on a display of the display housing. As an example, where a cellular phone is coupled at a side edge of a display housing, similar operations may be performed where left and right are akin to up and down and up and down are akin to left and right.

As an example, a frame of a display housing can include a hinge assembly edge, a top edge and opposing side edges where a cellular phone coupling is proximate to one of the side edges. As an example, a display housing may include one or more cellular phone couplings such that a position can be selected from amongst multiple cellular phone couplings and/or such that multiple cellular phones may be coupled to the display housing.

As an example, a cellular phone coupling can include an adjustment feature for adjusting a distance of a cellular phone that extends beyond an edge of a frame of a display housing. For example, consider the display housing as including the adjustment feature as a series of spatially arranged magnets or, for example, consider the adjustment feature as including a translatable clip.

As an example, a cellular phone coupling can include an adjustment feature for adjusting an angle of a cellular phone with respect to a display housing. In such an example, consider an adjustment feature that includes at least one hinge. In such an example, an adjustment feature may be controlled at least in part by gravity to adjust the angle automatically responsive to a display angle of the display housing. For example, gravity may tend to keep a position of a cellular phone upright such that angling of a display housing backwards does not cause a camera of the cellular phone to face in a more downward direction. As an example, such an approach may be automatic in that a cellular phone coupling can automatically angle the cellular phone camera and/or cellular phone display if being viewed by someone viewing from a back side of a laptop, tablet, display/monitor, etc.

As an example, a system can include circuitry that detects engagement of a cellular phone by a cellular phone coupling. In such an example, the circuitry may detect orientation of a cellular phone display of the cellular phone with respect to a display housing.

As an example, a system can include circuitry that receives imagery acquired via a camera of a cellular phone and that renders the imagery to at least a portion of a display of a display housing. In such an example, the circuitry can include video conferencing circuitry.

As an example, a system can include circuitry that replicates a graphical user interface of a portion of a cellular phone and that renders the graphical user interface to a display of a display housing. In such an example, a portion of the graphical user interface may be hidden by the display housing where the portion that is rendered is the hidden portion, while another portion may be exposed and may be active for user input (e.g., touch input). As explained, a change in position of a cellular phone with respect to a display housing can result in adjusting rendering of a graphical user interface. As an example, a rendered graphical user interface may be interacted with using one or more human input devices (HIDs), which can include touch, stylus, voice, mouse, etc.

As an example, circuitry can be included in a system that transmits signals responsive to interaction with a graphical user interface rendered to a display of a display housing to a cellular phone for control of the cellular phone.

As an example, circuitry can be included in a system that adjusts a replication of a graphical user interface responsive to adjustment of a cellular phone with respect to an edge of a frame of a display housing.

As an example, a system can include camera selection circuitry that selects a camera from a group of a camera of a display housing and at least one camera of a cellular phone. In such an example, the at least one camera of the cellular phone can include one or more of a front facing camera and a rear facing camera. As an example, a system may include multiple cellular phone couplings suitable for coupling of more than one cellular phone to a display housing. In such an example, circuitry can be provided that can suitably control one or more of the cellular phones for one or more purposes.

As an example, a system can include a processor; memory accessible to the processor; a base housing; and a hinge assembly that couples a display housing and the base housing. In such an example, the system can include one or more cellular phone couplings to couple one or more cellular phones to the display housing.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 13:
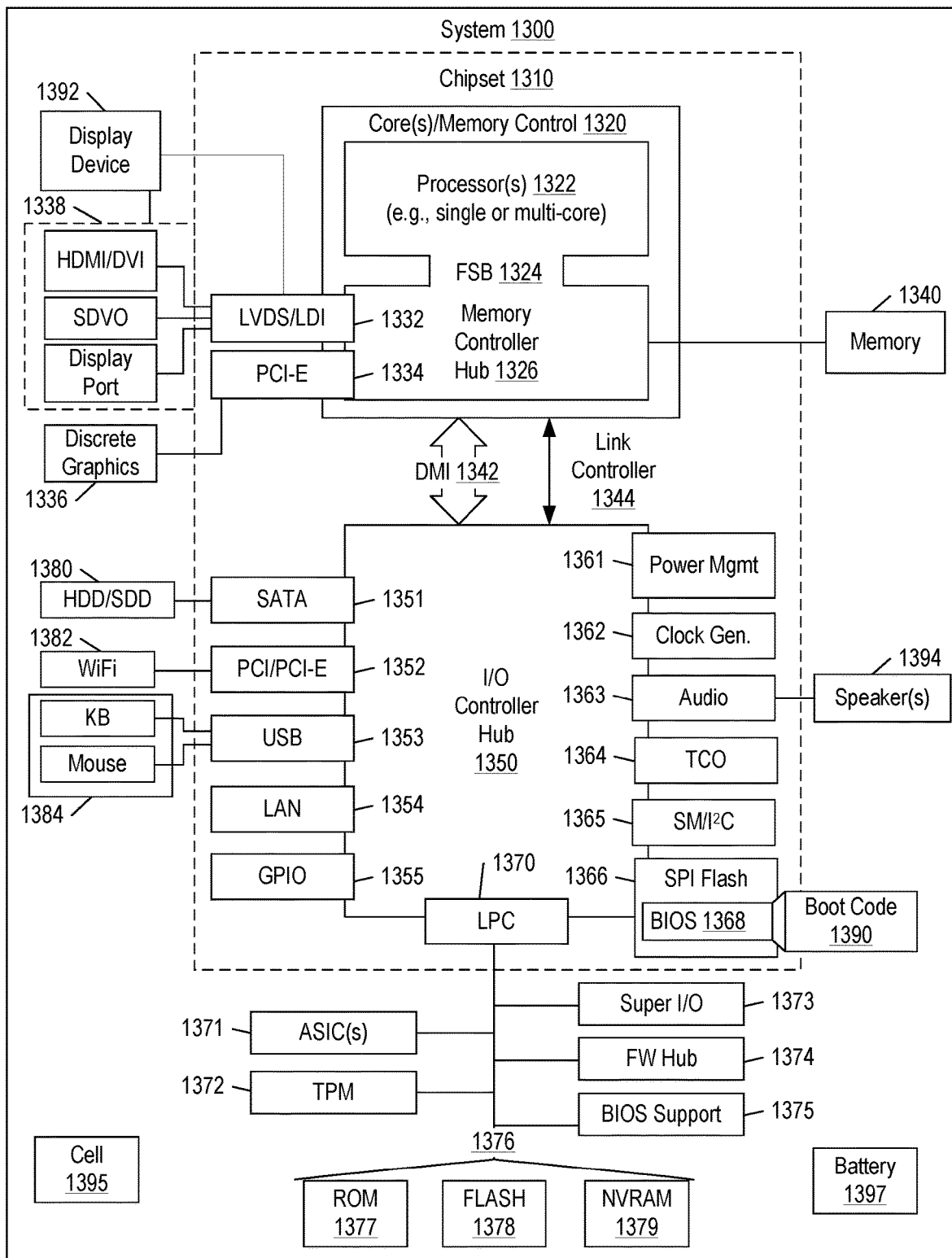
FIG. 13 is a diagram of an example of a system that includes one or more processors.

While various examples of circuits or circuitry have been discussed, FIG. 13 depicts a block diagram of an illustrative computer system 1300. The system 1300 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a system or other machine may include other features or only some of the features of the system 1300. As an example, a system such as the computing device 100 of FIG. 1, the computing device or system 200 of FIGS. 2 and 3, the phone 400, etc., may include at least some of the features of the system 1300.

As shown in FIG. 13, the system 1300 includes a so-called chipset 1310. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 13, the chipset 1310 has a particular architecture, which may vary to some extent depending on brand or manufacturer. The architecture of the chipset 1310 includes a core and memory control group 1320 and an I/O controller hub 1350 that exchange information (e.g., data, signals, commands, etc.) via, for example, a direct management interface or direct media interface (DMI) 1342 or a link controller 1344. In the example of FIG. 13, the DMI 1342 is a chip-to-chip interface (sometimes referred to as being a link between a "northbridge" and a "southbridge").

The core and memory control group 1320 include one or more processors 1322 (e.g., single core or multi-core) and a memory controller hub 1326 that exchange information via a front side bus (FSB) 1324. As described herein, various components of the core and memory control group 1320 may be integrated onto a single processor die, for example, to make a chip that supplants the conventional "northbridge" style architecture.

The memory controller hub 1326 interfaces with memory 1340. For example, the memory controller hub 1326 may provide support for DDR SDRAM memory (e.g., DDR, DDR2, DDR3, etc.). In general, the memory 1340 is a type of random-access memory (RAM). It is often referred to as "system memory".

The memory controller hub 1326 further includes a low-voltage differential signaling interface (LVDS) 1332. The LVDS 1332 may be a so-called LVDS Display Interface (LDI) for support of a display device 1392 (e.g., a CRT, a flat panel, a projector, etc.). A block 1338 includes some examples of technologies that may be supported via the LVDS interface 1332 (e.g., serial digital video, HDMI/DVI, display port). The memory controller hub 1326 also includes one or more PCI-express interfaces (PCI-E) 1334, for example, for support of discrete graphics 1336. Discrete graphics using a PCI-E interface has become an alternative approach to an accelerated graphics port (AGP). For example, the memory controller hub 1326 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1350 includes a variety of interfaces. The example of FIG. 13 includes a SATA interface 1351, one or more PCI-E interfaces 1352 (optionally one or more legacy PCI interfaces), one or more USB interfaces 1353, a LAN interface 1354 (more generally a network interface), a general purpose I/O interface (GPIO) 1355, a low-pin count (LPC) interface 1370, a power management interface 1361, a clock generator interface 1362, an audio interface 1363 (e.g., for speakers 1394), a total cost of operation (TCO) interface 1364, a system management bus interface (e.g., a multi-master serial computer bus interface) 1365, and a serial peripheral flash memory/controller interface (SPI Flash) 1366, which, in the example of FIG. 13, includes BIOS 1368 and boot code 1390. With respect to network connections, the I/O hub controller 1350 may include integrated gigabit Ethernet controller lines multiplexed with a PCI-E interface port. Other network features may operate independent of a PCI-E interface.

The interfaces of the I/O hub controller 1350 provide for communication with various devices, networks, etc. For example, the SATA interface 1351 provides for reading, writing or reading and writing information on one or more drives 1380 such as HDDs, SDDs or a combination thereof. The I/O hub controller 1350 may also include an advanced host controller interface (AHCI) to support one or more drives 1380. The PCI-E interface 1352 allows for wireless connections 1382 to devices, networks, etc. The USB interface 1353 provides for input devices 1384 such as keyboards (KB), one or more optical sensors, mice and various other devices (e.g., microphones, cameras, phones, storage, media players, etc.). On or more other types of sensors may optionally rely on the USB interface 1353 or another interface (e.g., I²C, etc.). As to microphones, the system 1300 of FIG. 13 may include hardware (e.g., audio card) appropriately configured for receipt of sound (e.g., user voice, ambient sound, etc.).

In the example of FIG. 13, the LPC interface 1370 provides for use of one or more ASICs 1371, a trusted platform module (TPM) 1372, a super I/O 1373, a firmware hub 1374, BIOS support 1375 as well as various types of memory 1376 such as ROM 1377, Flash 1378, and non-volatile RAM (NVRAM) 1379. With respect to the TPM 1372, this module may be in the form of a chip that can be used to authenticate software and hardware devices. For example, a TPM may be capable of performing platform authentication and may be used to verify that a system seeking access is the expected system.

The system 1300, upon power on, may be configured to execute boot code 1390 for the BIOS 1368, as stored within the SPI Flash 1366, and thereafter processes data under the control of one or more operating systems and application software (e.g., stored in system memory 1340). An operating system may be stored in any of a variety of locations and accessed, for example, according to instructions of the BIOS 1368. Again, as described herein, a satellite, a base, a server or other machine may include fewer or more features than shown in the system 1300 of FIG. 13. Further, the system 1300 of FIG. 13 is shown as optionally include cell phone circuitry 1395, which may include GSM, CDMA, etc., types of circuitry configured for coordinated operation with one or more of the other features of the system 1300. Also shown in FIG. 13 is battery circuitry 1397, which may provide one or more battery, power, etc., associated features (e.g., optionally to instruct one or more other components of the system 1300). As an example, a SMBus may be operable via a LPC (see, e.g., the LPC interface 1370), via an I²C interface (see, e.g., the SM/I²C interface 1365), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
    a display housing that comprises a display, a frame, a display side, and a back side;
    a cellular phone coupling that couples a cellular phone to the display housing with a portion of the cellular phone extendable a distance beyond an edge of the frame of the display housing, wherein the cellular phone coupling comprises at least one component that couples the cellular phone to the display housing with a back side of the cellular phone facing the back side of the display housing and that couples the cellular phone to the display housing with a display side of the cellular phone facing the back side of the display housing; and
    circuitry that makes a distinction between the back side of the cellular phone facing the back side of the display housing and the display side of the cellular phone facing the back side of the display housing, wherein, based on the distinction that the display side of the cellular phone faces the back side of the display housing, the circuitry renders a representation of at least another portion of the cellular phone to the display of the display housing.

2. The system of claim 1, wherein the at least one component comprises at least one magnet.

3. The system of claim 1, wherein the at least one component comprises a clip.

4. The system of claim 1, wherein, based on the distinction, the circuitry selects at least one camera of the cellular phone from a plurality of cameras of the cellular phone for image capture and image rendering to the display of the display housing, wherein the plurality of cameras of the cellular phone comprises at least one display side camera and at least one back side camera.

5. The system of claim 1, wherein the frame comprises a hinge assembly edge, a top edge and opposing side edges and wherein the cellular phone coupling is proximate to one of the side edges.

6. The system of claim 1, wherein the cellular phone coupling comprises an adjustment feature for adjusting the distance of the cellular phone that extends beyond the edge of the frame of the display housing.

7. The system of claim 6, wherein the display housing comprises the adjustment feature as a series of spatially arranged magnets.

8. The system of claim 6, wherein the adjustment feature comprises a translatable clip.

9. The system of claim 1, wherein the cellular phone coupling comprises an adjustment feature for adjusting an angle of the cellular phone with respect to the display housing.

10. The system of claim 9, wherein the adjustment feature comprises at least one hinge.

11. The system of claim 9, wherein the adjustment feature is controlled by gravity to adjust the angle automatically responsive to a display angle of the display housing.

12. The system of claim 1, comprising circuitry that detects engagement of a cellular phone by the cellular phone coupling.

13. The system of claim 12, wherein the circuitry detects orientation of a cellular phone display of the cellular phone with respect to the display housing.

14. The system of claim 1, comprising circuitry that replicates a graphical user interface of another portion of the cellular phone and renders the graphical user interface to the display of the display housing.

15. The system of claim 14, wherein the circuitry transmits signals responsive to interaction with the graphical user interface rendered to the display of the display housing to the cellular phone for control of the cellular phone.

16. The system of claim 14, wherein the circuitry adjusts the replication of the graphical user interface responsive to adjustment of the cellular phone with respect to an edge of the frame of the display housing.

17. The system of claim 1, comprising a processor; memory accessible to the processor; a base housing; and a hinge assembly that couples the display housing and the base housing.

18. A system comprising:
a display housing that comprises a display, a frame, a display side, and a back side; and
a cellular phone coupling that couples a cellular phone to the display housing with a portion of the cellular phone extendable a distance beyond an edge of the frame of the display housing, wherein the cellular phone coupling comprises an adjustment feature for adjusting an angle of the cellular phone with respect to the display housing, and wherein the adjustment feature is controlled by gravity to adjust the angle automatically responsive to a display angle of the display housing.

19. A system comprising:
a display housing that comprises a display, a frame, a display side, and a back side;
a cellular phone coupling that couples a cellular phone to the display housing with a portion of the cellular phone extendable a distance beyond an edge of the frame of the display housing; and
circuitry that replicates a graphical user interface of another portion of the cellular phone and renders the graphical user interface to the display of the display housing, wherein the circuitry adjusts the replication of the graphical user interface responsive to adjustment of the cellular phone with respect to an edge of the frame of the display housing.

20. The system of claim 19, wherein the circuitry transmits signals responsive to interaction with the graphical user interface rendered to the display of the display housing to the cellular phone for control of the cellular phone.

* * * * *